(12) United States Patent
Ramanath et al.

(10) Patent No.: US 11,221,234 B2
(45) Date of Patent: Jan. 11, 2022

(54) ENGINEERING AUTOMATION USING QUANTIFICATION AND VISUALIZATION OF GLOBAL SENSITIVITIES IN SPATIAL TEMPORAL DOMAIN

(71) Applicants: Siemens Aktiengesellschaft, Munich (DE); Siemens Technology and Services Pvt. Ltd., Mumbai (IN); Siemens Energy, Inc., Orlando, FL (US)

(72) Inventors: Vinay Ramanath, Charlotte, NC (US); Tobias Keute, Charlotte, NC (US); Anant Kumar Mishra, Charlotte, NC (US); Himanshu Bhatnagar, Charlotte, NC (US)

(73) Assignee: Siemens Aktiengesellschaft, Munich (DE)

( * ) Notice: Subject to any disclaimer, the term of this patent is extended or adjusted under 35 U.S.C. 154(b) by 283 days.

(21) Appl. No.: 16/115,662

(22) Filed: Aug. 29, 2018

(65) Prior Publication Data

US 2020/0072638 A1 Mar. 5, 2020

(51) Int. Cl.
*G01D 5/00* (2006.01)

(52) U.S. Cl.
CPC ...................................... *G01D 5/00* (2013.01)

(58) Field of Classification Search
CPC ........... G01D 5/00; G06F 17/18; G06F 17/10; G06K 9/6232; G05B 19/41885
See application file for complete search history.

(56) References Cited

U.S. PATENT DOCUMENTS

2016/0055125 A1 2/2016 Razavi et al.

OTHER PUBLICATIONS

Gunawan et al., Sensitivity Analysis of Discrete Stochastic Systems, Apr. 2005, Biophysical Journal, vol. 88, pp. 2530-2540 (Year: 2005).*

(Continued)

*Primary Examiner* — Toan M Le

(57) ABSTRACT

Technical solutions are described for performing sensitivity analysis for engineering systems in spatial-temporal domain. An example method includes receiving a set of process parameters and retrieving a multidimensional dataset containing historical values of the process parameters and corresponding output values. The method further includes selecting a sampling algorithm to divide the multidimensional dataset into multiple subspaces, and selecting multiple samples ($x_i$), one sample from each subspace. The method further includes perturbing the samples, computing a first effect ($EE_i$) on an output value (y), and computing a second effect ($SEE_{ij}$) of perturbing a pair of samples ($x_i$ and $x_j$) on the output value. The method further includes computing a sensitivity coefficient of the process parameters on the output value using the second effect for $x_i$ and $x_j$, the first effect for $x_i$, and the first effect for $x_j$. An automatic visualization scheme for the global sensitivity results is also provided.

16 Claims, 9 Drawing Sheets

(56) References Cited

OTHER PUBLICATIONS

Bekey et al., Sensitivity of Discrete Systems to Variation of Sampling Interval, Apr. 1966, IEEE Transactions on Automatic Control, vol. 11, Issue 2, pp. 284-287 (Year: 1966).*
Bekey_Abstract, Apr. 1966, 1 pp. (Year: 1966).*
IEEE_Xplore_Search_Results, Mar. 31, 2021, 1 pp. (Year: 2021).*
European Search Report dated Mar. 9, 2020; Application No. 19193790.3; 13 pages.
Gregory A Banyay et al.: "Sensitivity Analysis of a Nuclear Reactor System Finite Element Model" 1' Jul. 8, 2018 (Jul. 18, 2018), pp. 1-10, iXP055671433, Retrieved from the Internet: URL:https://asmedigitalcollection.asme.org/VVS/proceedings-pdf/VVS2018/40795/V001T04 A001/2792617/v001t04a001-vvs2018-9306.pd.
Benjamin Lamoureux et al.: "A combined sensitivity analysis and kriging surrogate modeling for early validation of health indicators"; Reliability Engineering and System Safety., vol. 130, Aug. 29, 2014 (Aug. 29, 2014), pp. 12-26, XP055671498; GB ISSN: 0951-8320, DOI: 10.1016/j.ress.2014.03.007.

\* cited by examiner

ENGINEERING AUTOMATION USING
QUANTIFICATION AND VISUALIZATION
OF GLOBAL SENSITIVITIES IN SPATIAL
TEMPORAL DOMAIN

BACKGROUND

Process control systems, such as distributed or scalable process control systems like those used in chemical, petroleum, oil and gas, manufacturing line, assembly line, or other processes, typically include one or more process controllers communicatively coupled each other, to at least one host or operator workstation and to one or more field devices via analog, digital or combined analog/digital buses. The output of such physical systems or processes can be sensitive to changes in parameter values of underlying systems and processes. Typically, field devices, which may include valves, switches are opened/closed based on measurements from one or more sensors (e.g., temperature, pressure and flow rate sensors) that measure the process parameters. It should be noted that in other examples, the field devices may include other devices, and/or the process parameters in other examples can be different from the above example.

The process controller receives measurement signals with process measurement values from the sensors, and uses this information to implement a control routine to generate control signals for the field devices to control the operation of the process. In one or more examples, the process parameter values are provided to an operator to perform any desired function with respect to the process, such as viewing the current state of the process, modifying the operation of the process, etc. The operator can modify the process based on a sensitivity analysis of the process parameters. It is thus desirable to determine sensitivity of the one or more process parameters.

BRIEF DESCRIPTION OF THE SEVERAL
VIEWS OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

SUMMARY

Figure 1:
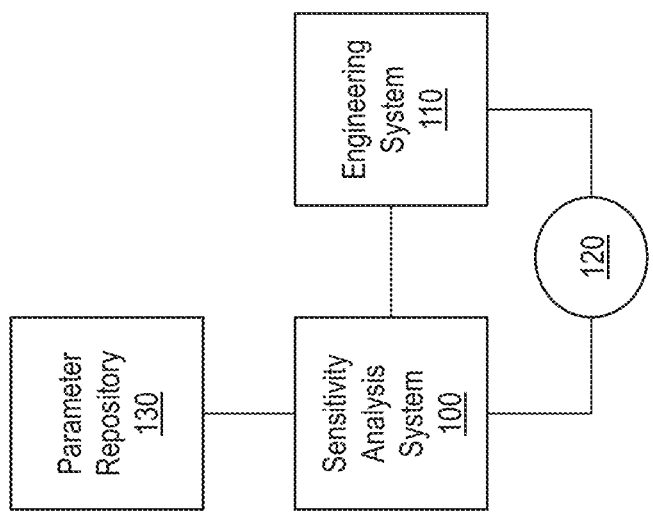
FIG. 1 depicts a block diagram of a sensitivity analysis system according to one or more embodiments.

According to one or more embodiments, a computer-implemented method for performing a sensitivity analysis of an engineering system in spatial temporal domain includes receiving a set of process parameters, each process parameter being a configurable input of the engineering system. The method further includes retrieving a multidimensional dataset containing historical values of the process parameters and corresponding output values of the engineering system. The method further includes selecting a sampling algorithm based to divide the multidimensional dataset into multiple subspaces. The method further includes selecting a plurality of samples ($x_i$) from the multidimensional dataset, the plurality of samples comprises one sample from each of the multiple subspaces. The method further includes perturbing the plurality of samples, computing a first effect ($EE_i$) of perturbing a sample ($x_i$) on an output value (y) of the engineering system, and computing a second effect ($SEE_{ij}$) of perturbing a pair of samples ($x_i$ and $x_j$) on the output value (y) of the engineering system. The method further includes computing a sensitivity coefficient of the process parameters on the output of the engineering system using the second effect for the samples $x_i$ and $x_j$, the first effect for the sample $x_i$, and the first effect for the sample $x_j$.

In one or more examples, the method further includes generating a visualization of the perturbed samples and the corresponding output values.

In one or more examples, perturbing a first sample from the plurality of samples includes changing the first sample from a first subspace to a second subspace. Alternatively, or in addition, perturbing a first sample from the plurality of samples includes changing the first sample by a percentage of a value of the first sample.

In one or more examples, the engineering system is a first engineering system, and the multidimensional dataset includes values of the process parameters from a second engineering system.

The set of process parameters is provided by an operator. Further, the first effect is computed as $$EE_i(x) = \frac{[y(x + e_i\Delta) - y(x)]}{y(x)},$$

where $e_i\Delta$ is a perturbation value, x is a sample value, and y is an output value.

In one or more examples, the method further includes automatically identifying one or more critical process parameters and one or more critical responses that affect the engineering system using dynamic estimation of weights.

According to one or more embodiments, a sensitivity analysis system, includes a memory device, and a processor coupled with the memory device. The processor performs a method for sensitivity analysis of an engineering system in temporal spatial domain. The method includes receiving a set of process parameters, each process parameter being a configurable input of the engineering system. The method further includes retrieving a multidimensional dataset containing historical values of the process parameters and corresponding output values of the engineering system. The method further includes selecting a sampling algorithm based to divide the multidimensional dataset into multiple subspaces. The method further includes selecting a plurality of samples ($x_i$) from the multidimensional dataset, the plurality of samples comprises one sample from each of the multiple subspaces. The method further includes perturbing the plurality of samples, computing a first effect ($EE_i$) of perturbing a sample ($x_i$) on an output value (y) of the engineering system, and computing a second effect ($SEE_{ii}$) of perturbing a pair of samples ($x_i$ and $x_j$) on the output value (y) of the engineering system. The method further includes computing a sensitivity coefficient of the process parameters on the output of the engineering system using the second effect for the samples $x_i$ and $x_j$, the first effect for the sample $x_i$, and the first effect for the sample $x_j$.

In one or more examples, the method further includes generating a visualization of the perturbed samples and the corresponding output values.

In one or more examples, perturbing a first sample from the plurality of samples includes changing the first sample from a first subspace to a second subspace. Alternatively, or in addition, perturbing a first sample from the plurality of samples includes changing the first sample by a percentage of a value of the first sample.

In one or more examples, the engineering system is a first engineering system, and the multidimensional dataset includes values of the process parameters from a second engineering system.

The set of process parameters is provided by an operator. Further, the first effect is computed as $$EE_i(x) = \frac{[y(x + e_i\Delta) - y(x)]}{y(x)},$$

where $e_i\Delta$ is a perturbation value, x is a sample value, and y is an output value.

In one or more examples, the method further includes automatically identifying one or more critical process parameters and one or more critical responses that affect the engineering system using dynamic estimation of weights.

According to one or more embodiments, a computer program product includes a storage medium readable by a processing circuit, the storage medium storing instructions executable by the processing circuit to cause a method to be performed for sensitivity analysis of an engineering system in temporal spatial domain. The method includes receiving a set of process parameters, each process parameter being a configurable input of the engineering system. The method further includes retrieving a multidimensional dataset containing historical values of the process parameters and corresponding output values of the engineering system. The method further includes selecting a sampling algorithm based to divide the multidimensional dataset into multiple subspaces. The method further includes selecting a plurality of samples ($x_i$) from the multidimensional dataset, the plurality of samples comprises one sample from each of the multiple subspaces. The method further includes perturbing the plurality of samples, computing a first effect ($EE_i$) of perturbing a sample ($x_i$) on an output value (y) of the engineering system, and computing a second effect ($SEE_{ii}$) of perturbing a pair of samples ($x_i$ and $x_j$) on the output value (y) of the engineering system. The method further includes computing a sensitivity coefficient of the process parameters on the output of the engineering system using the second effect for the samples $x_i$ and $x_j$, the first effect for the sample $x_i$, and the first effect for the sample $x_j$.

In one or more examples, the method further includes generating a visualization of the perturbed samples and the corresponding output values.

In one or more examples, perturbing a first sample from the plurality of samples includes changing the first sample from a first subspace to a second subspace. Alternatively, or in addition, perturbing a first sample from the plurality of samples includes changing the first sample by a percentage of a value of the first sample.

In one or more examples, the engineering system is a first engineering system, and the multidimensional dataset includes values of the process parameters from a second engineering system.

The set of process parameters is provided by an operator. Further, the first effect is computed as $$EE_i(x) = \frac{[y(x + e_i\Delta) - y(x)]}{y(x)},$$

where $e_i\Delta$ is a perturbation value, x is a sample value, and y is an output value.

In one or more examples, the method further includes automatically identifying one or more critical process parameters and one or more critical responses that affect the engineering system using dynamic estimation of weights.

DETAILED DESCRIPTION

Example embodiments include, among other things, methods and techniques for deriving parameter sensitivities and their visualization on a global scale, time and space. Particularly, the embodiments provide parameter sensitivity and visualization for process parameters of physical systems or processes where the output can be sensitive to changes in parameter values of underlying systems and processes. In addition to the physical parameters such as temperature, pressure, etc., the process parameters can include one or more model parameters used for a process model that represents the physical system, such as forcings, boundary conditions, etc.

Existing techniques to address such technical problems include computing local sensitivities of one or more process parameters. For example, a process parameter is perturbed (according to one process parameter at a time) around a single design point to derive sensitivity measures arising out of effecting a change in responses. The results from these approaches are typically valid near the region where the sensitivities are derived. Alternatively, other techniques use derivative approaches that include evaluating derivatives or slopes around key design points and deriving sensitivity metrics from derivative information. The primary assumption behind the derivative approach is that the response is differentiable and continuous. The derivative approach also yields a local solution for sensitivities. Alternatively still, Monte Carlo methods are used, which include propagating variance from input variable space to responses spaces and using ANOVA techniques to apportion the response variation to input variation. The Monte Carlo method has limitations in scaling up for higher dimensions (large number of process parameters) and estimation of variance is an extremely computationally intense task, while displaying an uncertainty in modeling variances for non-normal response distributions.

Thus, existing techniques of sensitivity analysis focus on different properties of the model response and can therefore lead to different, sometimes conflicting, conclusions about the underlying sensitivities because of the resulting local sensitivities. Further, the existing techniques are computationally expensive. The technical solutions described herein address such technical problems and provide improved apparatus, systems and methods for providing sensitivities of a physical system output with respect to process parameter (or system parameters).

FIG. 1 depicts a block diagram of a sensitivity analysis system according to one or more embodiments. The sensitivity analysis system 100 is coupled with an engineering system 110. In one or more examples, an operator 120 can interact with the sensitivity analysis system 100 and the engineering system 110. For example, the operator 120 views one or more results on the sensitivity analysis system 100 and in response changes one or more operative settings of the engineering system 110. Alternatively, or in addition, the sensitivity analysis system 100 can automatically change one or more operative settings of the engineering system 110, for example, via an application programming interface (API), a control signal, and the like.

The engineering system 110 can be an oil and gas drilling system, a manufacturing machinery, an assembly line, a heating and ventilation system, or any other such engineering system. In one or more examples, the engineering system 110 includes a computer server, or any other computing device that operates one or more process controllers in the engineering system 110 based on one or more process parameters as described herein.

The sensitivity analysis system 100 includes a computing device such as a computer server, or any other computing device that receives one or more of the process parameters associated with the engineering system 110. The sensitivity analysis 100, in one or more examples, has access to a process parameter values from other engineering systems that are stored in a parameter repository 130. Alternatively, or in addition, the parameter repository 130 also includes historical parameter values from the engineering system 110.

The parameter repository 130 can be a data warehouse, a database, or any other data storage that is accessible by the sensitivity analysis system 100.

The sensitivity analysis system 100 uses the stored data in the parameter repository 130 to determine "global sensitivity" based on the one or more process parameters of the engineering system 110. The process parameters can span a temporal and/or a spatial domain. For example, the process parameters can include temperature, pressure, permitted design variance, one or more input parameters of the engineering system 110, design variables assigned with the engineering system 110, and the like. The parameter repository 130 also includes nominal design values, allowable tolerances, and their region of interest. For example when deriving sensitivity for a mechanical component, the dimensions such as length, thickness, diameter, fillet dimensions, material properties, manufacturing process, and time varying production control parameters, are recorded; additionally the uncertainties in these parameters are tagged to the nominal parameters of interest in design engineering constants applicable for spatial temporal domain. Accordingly, the sensitivity analysis system 100 can access, from the parameter repository 130, factors used to compute sensitivity metrics for the engineering system 110, and particularly to compute global sensitivity metrics.

Typically, to compute the sensitivity, the sensitivity analysis system 100 uses a model of the engineering system 110. Typically, the sensitivity of the model to a particular process parameter is computed as a 'rate of change (slope)' of a response of the model in the direction of increasing values of that process parameter. Typically, the response of the model is represented by a function such as:

$$y = f(x_1, x_2, \ldots, x_n) \qquad \text{Equation (1).}$$

Here, y is the model response and $x_i$ represents a process parameter in the n-dimensional space. The n-dimensional space can be represented as an n-dimensional hypercube bounded by ranges of each of the process parameters, for example, $x_1^{min}, \ldots x_n^{min}$ and $x_1^{max}, \ldots x_n^{max}$.

The sensitivity of the model, and in turn the engineering system 110, to a process parameter $x_i$ is computed by computing the rate of change, $s_i$, of the response y with respect to $x_i$ (where $1 \le i \le n$). The $s_i$ can be evaluated at a specific point $(x_1^*, \ldots, x_n^*)$ in the process parameter space as the partial derivative of y with respect to $x_i$ at that location:

$$s_i = \left(\frac{\partial y}{\partial x_i}\right)_{(x_1^*, \ldots, x_n^*)}. \qquad \text{Equation (2)}$$

The rate of change $s_i$ is sometimes referred to as the 'sensitivity coefficient', and relates only to the independent effect of process parameter $x_i$, when all other process parameter are held constant. To consider the co-varying effects of multiple process parameter, the sensitivity of the model response to interactions among the process parameter is defined using higher-order partial derivatives. For example, the two-factor interaction between $x_i$ and $x_j$ (where $i \ne j$ and $1 \le i,j \le n$) on the model response is represented using second-order partial derivatives, and is interpreted as the rate of change of slope in the direction of $x_i$ as we move in the direction of $x_j$ (and vice versa). Similarly, the sensitivity due to three-factor interactions, such as between $x_i$, $x_j$, and $x_k$ (where $i \ne j \ne k$ and $1 \le i,j,k \le n$) is defined using third-order partial derivatives and interpreted as the change in the two-factor interaction of $x_i$ and $x_j$ as we change $x_k$. At a given point $(x_1^*, \ldots, x_n^*)$, such two- and three-factor interactions, $s_{ij}$ and $s_{ijk}$, are computed as:

$$s_i = \left(\frac{\partial^2 y}{\partial x_j \partial x_i}\right)_{(x_1^*, \ldots, x_n^*)}; \text{ and} \qquad \text{Equation (3)}$$

$$s_i = \left(\frac{\partial^3 y}{\partial x_k \partial x_j \partial x_i}\right)_{(x_1^*, \ldots, x_n^*)}. \qquad \text{Equation (4)}$$

Accordingly, at any given point in the n-dimensional factor space, $2^n - 1$ sensitivity coefficients can be calculated including n slopes, $$\binom{n}{2}$$

two-factor interactions, $$\binom{n}{3}$$

three-factor interactions, and so on. Such point-based sensitivity coefficient calculation is 'local sensitivity analysis', because the resulting sensitivity coefficients are, in general, valid locally in the close vicinity of the 'base point' in the process parameter space.

Such local sensitivity computation provides a limited view of model sensitivity because the results (and hence interpretation) vary with the location of the point in the process parameter space being used for the computation. Such local sensitivity analysis causes the operator 120 to configure the engineering system 110 in a suboptimal or incorrect manner and hence is a technical problem. The technical solutions described herein address such technical problem by providing global sensitivity analysis to provide results that characterize the model response sensitivity over the entire process parameter space. Further, the technical solutions described herein use a temporal process parameter space, using historical and/or time dependent parameter values to provide additional insights when providing sensitivity analysis output.

Figure 2:
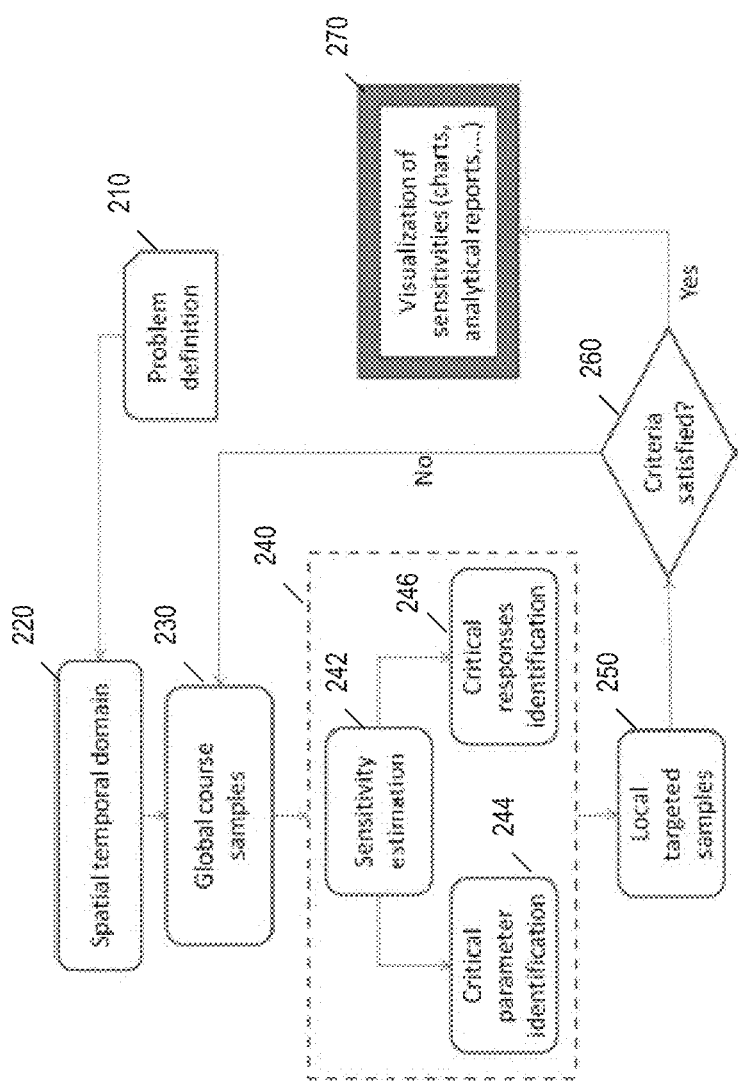
FIG. 2 depicts a dataflow diagram of a method to provide sensitivity analysis output for the engineering system according to one or more embodiments.

FIG. 2 depicts a dataflow diagram of a method to provide sensitivity analysis output for the engineering system 110 according to one or more embodiments. The method facilitates performing coarse sampling across the process parameter spatial and temporal space of interest to estimate the global sensitivities through identifying critical parameters and responses as measured through percent change in responses per unit change in design variables and other process parameters. Further, the method uses particular convergence criteria to perform locally targeted samples to refine the sensitivity search and iterate over the process parameter spatial and temporal, until the convergence criteria is satisfied. Further, the method provides a visualization scheme that aids the operator 120 during the decision making process of configuring the engineering system 110 in autonomous or expert driven mode by providing real time informatics on the sensitivities both in global and local space domains.

To this end, the method includes the sensitivity analysis system 100 receiving a problem definition, at 210. The problem definition includes providing a set of process parameters for sensitivity analysis. For example, the sensitivity of the engineering system 110 with respect to the set of parameters is to be analyzed to identify which process parameters among the set are dominating, i.e. are influencing the operation of the engineering system 110 more than the others. The operator 120 can provide the problem definition via a user-interface of the sensitivity analysis system 100, in one or more examples.

The method further includes accessing the process parameter values from the parameter repository 130, at 220. As described herein, the parameter repository 130 can include parameter values from the past as well as from other engineering systems 110 of the same type as the engineering system 110. The sensitivity analysis system 100 accordingly retrieves a multidimensional design space from the parameter repository 130, the multidimensional design space bounded by the process parameters specified in the problem definition. In one or more examples, the multidimensional space can include 100 or even more process parameters to analyze, making it impractical, if not impossible for performing the sensitivity analysis by a human, particularly if results are to be obtained in substantially real time. The multidimensional space, in one or more examples, is a multidimensional dataset containing electronic data. The dataset includes parameter values and output (response) values from previous operations of the engineering system 110 and/or operations of other engineering systems.

Further, the method includes performing a global course sampling of the multidimensional space, at 230. The global course sampling divides the multidimensional space into smaller subspaces. The division of the strata is performed by selecting a sampling algorithm from a predetermined list of algorithms. The algorithm is selected according to a type of distributions specified on the process parameters included in the problem definition. For example, the list of sampling algorithms can include Monte Carlo (MC), latin hypercube (LH), optimized latin hypercube (OLH), and the like.

Figure 4:
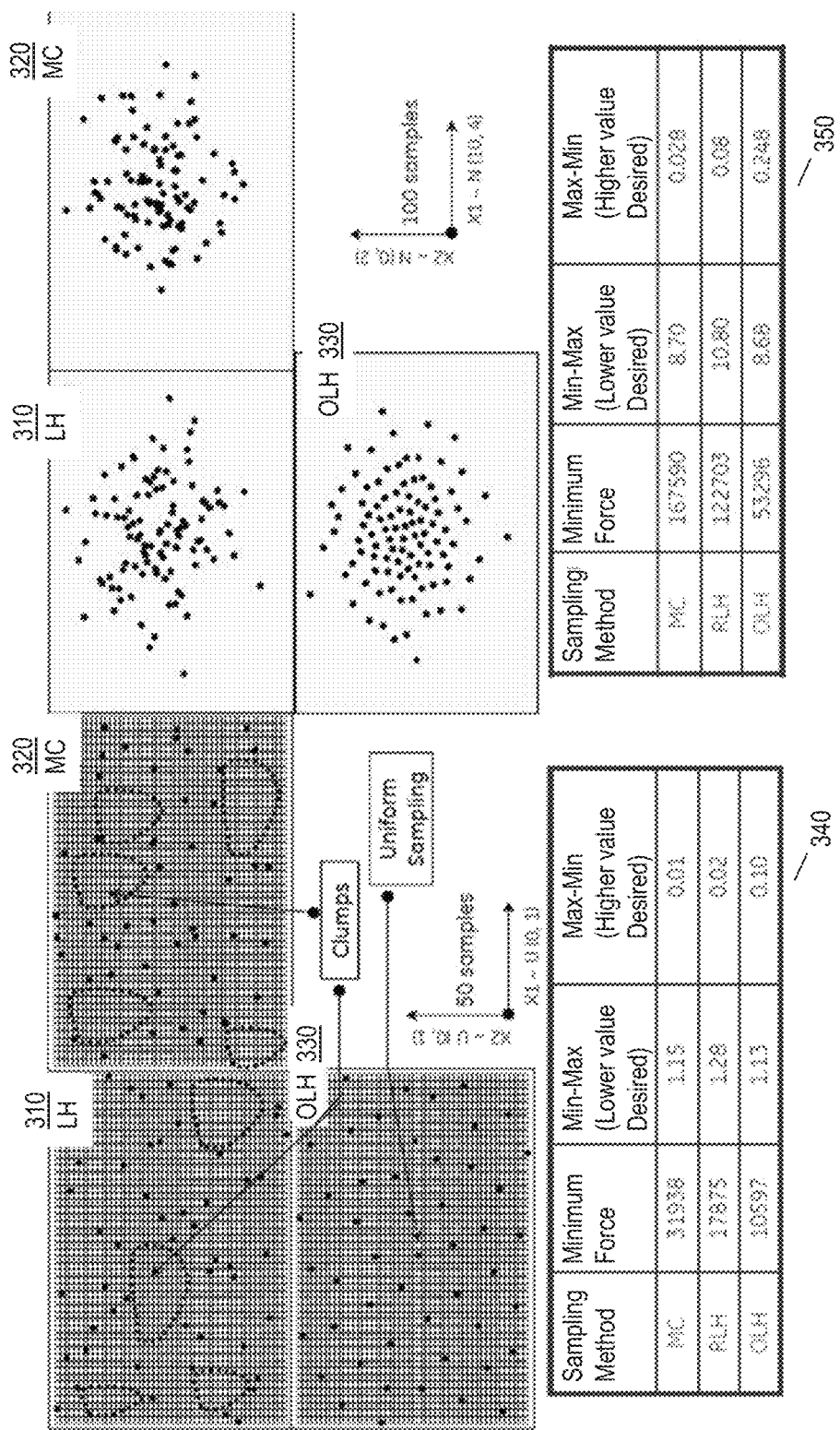
FIG. 4 depicts an example scenario where an optimized latin hypercube algorithm is selected to divide a multidimensional sample space.

FIG. 4 depicts an example scenario where the OLH algorithm is selected to divide the multidimensional space. Here, MC, LH, and OLH sampling is illustrated for an example multidimensional space. As can be seen from FIG. 4, the sampling from MC (320) has most number of void regions, the LH sampling (310) has fewer voids, and OLH sampling (330) has none. The absence of voids in OLH samples (330) provides a better sampling across the region of interest, leading to an estimation of sensitivity with improved accuracy in this case. The metrics in the tables 340 and 350 corroborate the visual proof. In this example scenario, among the sampling algorithms, the OLH outperforms the other sampling techniques. It should be noted that in other examples, a different sampling algorithm can outperform the others. The sampling algorithm that has optimal performance based on the factors like minimum force, min-max, and max-min associated with executing the sampling algorithm on the specified process parameters is selected.

Using the selected sampling algorithm, the multidimensional space is divided into smaller subspaces. Further one sample out of each subspace is selected so that there is no other sample with a same coordinate as the selected sample. This facilitates accessing the most information out of the Design Space Exploration (DOE) with as few samples as possible. For evaluations around a certain Region of Interest (ROI) specified by the process parameters, the subspace is compressed to gain more information around that ROI, without losing overview of designs further away from the ROI.

Referring to FIG. 2, the method further includes identifying the dominant process parameters using sensitivity analysis, at 240. The sensitivity analysis includes computing sensitivity estimates using the samples obtained using the selected sampling algorithm, at 242.

Figure 5:
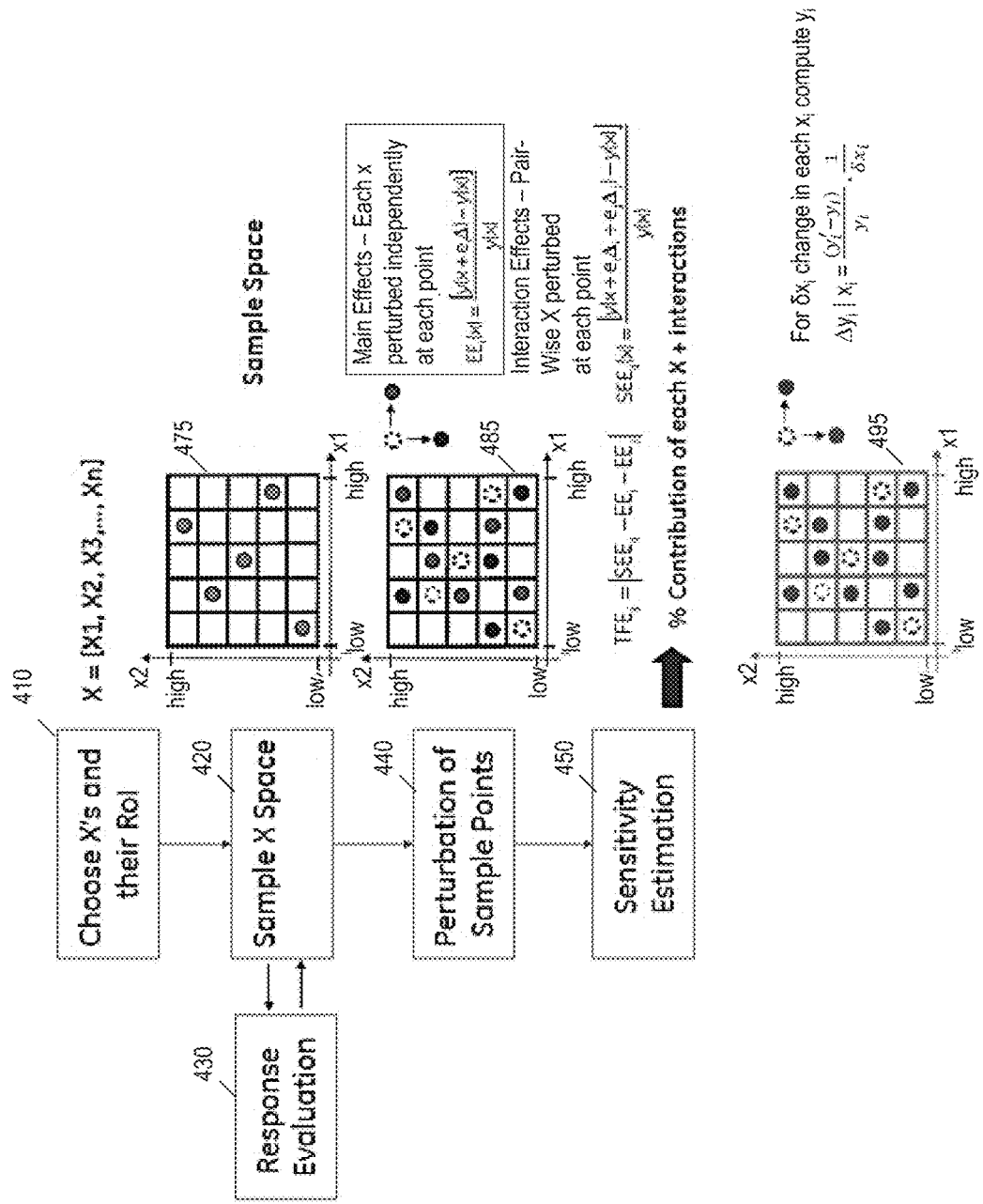
FIG. 5 depicts a flowchart of computing sensitivity estimates according to one or more embodiments.

FIG. 5 depicts a flowchart of computing sensitivity estimates according to one or more embodiments. The sensitivity estimates are computed for the process parameters (X) provided in the problem definition, at 410. The problem definition also provides the ROIs for the process parameters being analyzed. The process parameter multidimensional space is sampled to perform response evaluation using the selected algorithm, at 420. The sampling algorithm generates a sample space for each process parameter X. The sampled space is a subspace of the multidimensional process parameter space. Further, the sampling includes selecting one sample out of each subspace so that there is no other sample with a same coordinate as the selected sample.

For each of the samples the gradient (numerical) of different values in the engineering system 110 is computed, at 430. The gradient computation can be performed by computing $s_i$ for each of the samples $x_i$. Accordingly, the sensitivity analysis system 100 is not limited in the number of output variables for which the gradient is calculated. The sensitivity analysis system 100 not only estimates the gradient of different output variables, but also for sample points from the simulation model. The response evaluation is performed for the selected samples concurrently, thus improving the efficiency of the analysis. For example, if the multidimensional process parameter space is divided into S number of sample subspaces, S sample points are selected from each subspace. The S sample points are then concurrently used to perform the response evaluation. In the FIG. 5, S is shown to be 5 (475).

Further, the sensitivity analysis system 100 perturbs each sample $x_i$, by a predetermined amount and monitors the change in all output values, at 440. The change in the response for each sample x is calculated as:

$$EE_i(x) = \frac{[y(x + e_i \Delta) - y(x)]}{y(x)}.$$ 
Equation (5)

Here, EE represents "Estimation Effect", representing the rate of change in response due to perturbation of one variable at a time; $y(x)$ is response value at the base point x; $y(x+\text{edelta})$ is response value at the perturbation of x; $c_i$, is a scalar, depending on x and delta is a constant.

The perturbation in the sample $x_i$ that is used as the input parameter triggers the corresponding change in the response that is computed (Equation 5). The output $y(x)$ can be an observed value of the engineering system 110, such as pressure, temperature, rotation, translation, or any other such change in the operation of the engineering system 110.

In one or more examples, the amount of perturbation can be decided by the operator 120. Alternatively, or in addition, the perturbation can be a predetermined amount. The perturbation can be provided as an adjacent cell, wherein the sample points are moved automatically to a neighboring cell in the sample subspace (485). The perturbation can also be specified as a percentage of design span. Alternatively, or in addition, the perturbation is provided as an absolute value. Further, in one or more examples, the perturbation is provided as a percentage of sample value. As noted in Equation 5, the corresponding changed output is used to calculate the estimated gradient as the fraction of the change in the output by the output at original sample as shown in Equation 5, and in FIG. 5.

Further, in one or more examples, an interaction effect can be computed, which represents a change in the output y caused by change in two or more samples together. For example, $SEE_{ij}$, a sensitivity effect caused by an interaction between changes in $x_i$ and $x_j$, can be computed as:

$$SEE_{ij}(x) = \frac{[y(x + e_i \Delta_i + e_j \Delta_j) - y(x)]}{y(x)}.$$
Equation (6)

Here, SEE represents "Secondary Estimation Effects", representing the rate of change in response due to the perturbation of two variables at a time.

Further, a sensitivity coefficient for process parameter $x_i$, can be computed, at 450, as:

$$TFE_{ij} = |SEE_{ij} - EE_i - EE_j|$$
Equation (7).

TFE represents "Total Factor Effects", representing the total effects of key responses of interest.

The sensitivity coefficient represents a percentage contribution of effect of perturbing (EE) each sample x and the interactions (SEE) between each pair of samples.

The computations of Equations 6 and 7 can be extended to more than two samples, up to n samples. For example, in case of three samples $x_i$, $x_j$, and $x_k$, the sensitivity analysis system 100 computes $TFE_{ijk}$ using $SEE_{ijk}$, and $EE_i$, $EE_j$, and $EE_k$. Here, the $SEE_{ijk}$ is computed as a change in output y with the perturbations in all three $x_i$, $x_j$, and $x_k$. In general:

$$SEE_{i-n}(x) = \frac{[y(x + \sum e_i \Delta_i) - y(x)]}{y(x)}; \text{ and}$$
Equation (8)

$$TFE_{i-n} = \left| SEE_{i-n} - \sum EE_i \right|.$$
Equation (9)

Alternatively, the estimate of the fraction of the change in the output by the change in the input parameter is used to calculate the estimated gradient. For example, each sample $x_i$ is perturbed (changed) by a value $\delta x_i$ and a corresponding change in $y_i$ is computed (495).

$$\Delta y_i \mid x_i = \frac{(y_i' - y_i)}{y_i} \cdot \frac{1}{\delta x_i}.$$
Equation (10)

Here, $\Delta y_i | x_i$ is a change in $y_i$ caused by the change in the sample $x_i$.

Referring to FIG. 2, the sensitivity coefficient for each process parameter is computed in this manner, at 242. Based on the sensitivity coefficient values, the critical process parameters are identified, for example, the process parameters with corresponding sensitivity coefficients within a predetermined range, at 244.

Figure 3:
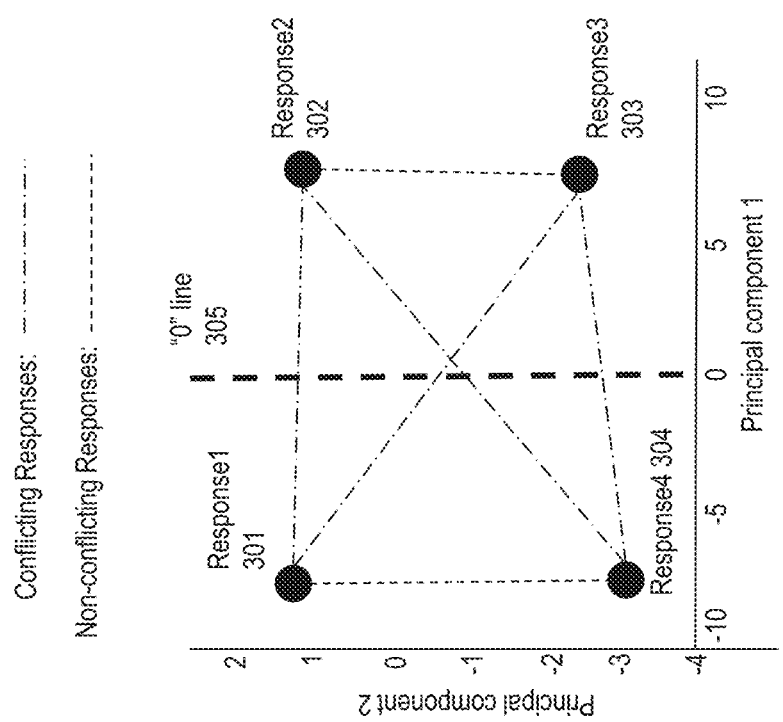
FIG. 3 depicts an example scenario used to describe a principal component analysis that is performed to identify critical responses according to one or more embodiments.

Alternatively, or in addition, critical responses of the engineering system 110 can also be identified, at 246. Responses that are conflicting with one another are deemed as critical. In one or more examples, identification of the critical responses is performed by employing principal component analysis (PCA) on the sampled data. The PCA determines which of the responses are conflicting and correlated. The first and second components of the PCA output are analyzed to determine the conflicting responses. FIG. 3 depicts an example scenario used to describe such an analysis. The first principal component (PC1) and second principal component (PC2) are used to generate a plot of the various computed responses (y(x)).

FIG. 3 depicts four responses 301-304 in such a plotted space. The plot is checked to identify the responses are on either side of "0" line (305) in the PC1-PC2 (PC: principal component) co-ordinate system. In the illustrated example, response1 301 conflicts with response2 302 and response3 303, and does not conflict with response4 304. Similar conflicting/non-conflicting relationship can be identified for the other combinations of responses 301-304. In one or more examples, the conflicting responses, i.e., the critical responses, are identified using the PCA results directly, without generating the plot as shown in FIG. 3.

The one or more identified critical parameters and critical responses are used to perform a local search to focus on a particular region of interest and can iterate with the global search till convergence is reached, at 250. Any search that is performed in a predetermined range/region of a particular value, sample is deemed as local or localized search. For example, a search of +−10% around a nominal design value can be considered as local search. The local sample data is provided to the operator 120 to check if a predetermined criteria is satisfied, at 260. The criteria is chosen by the operator 120 based on the physical interpretations of the problem. For example, the criteria can be about the approximate contribution of each factor and the algorithm seeks samples to address the criteria provided.

If the criteria is not satisfied, the process is repeated to sample the multidimensional process parameter space in a different manner, at 260. If the criteria is satisfied, the sensitivity analysis results are provided to the operator 120 to configure the engineering system 110, at 270. Alternatively, or in addition, the sensitivity analysis results are used by one or more automatic processes to configure the engineering system 110.

Figure 6:
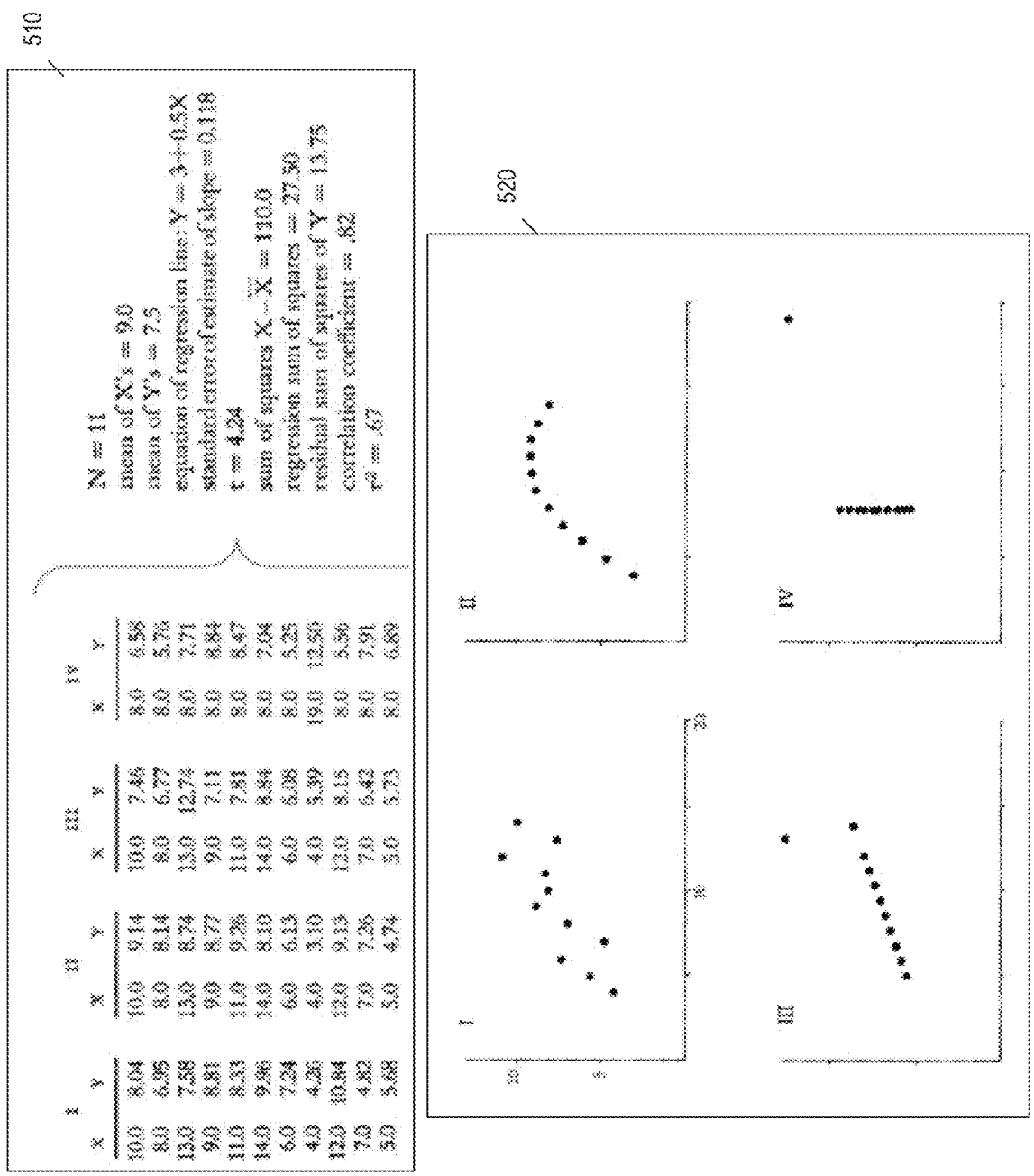
FIG. 6 depicts statistics for each of four data sets that can seem to be similar numerically

Further, deriving sensitivities purely from raw data may not convey an effect of the process parameters on the engineering system 110 in an effective manner to the operator 120. For example, FIG. 6 depicts statistics for each of four data sets that can seem to be similar numerically, at 500A. However, the same data when represented in plots effectively convey that the four data sets are substantially different, at 500B.

The technical solutions described herein address the technical problem of conveying the sensitivity analysis to the operator 120 in an effective manner by generating and displaying at least two types of visualization schemes for global sensitivity analysis.

Figure 7:
FIG. 7 depicts a visualization scheme for the global sensitivity analysis results according to one or more embodiments.

FIG. 7 depicts a visualization scheme for the global sensitivity analysis results according to one or more embodiments. Here, the samples X and the corresponding outputs Y are used for creating a matrix/carpet plot 600. The carpet plot 600 includes multiple cells 610, each cell 610 including a plot for a corresponding pair of a process parameter $x_i$ vs. an output $y_i$, a plot for an output $y_i$ vs. a process parameter $x_i$, a process parameter $x_i$ vs. a process parameter $x_j$, or an output $y_i$ vs. an output $y_j$.

In one or more examples, a computer vision like convolutional neural network, is used to scan the carpet plot 600 to derive insights into the trends illustrated by the multiple plots 610. The insights are obtained by several techniques, for example, by evaluating and comparing correlation coefficients, fitting non-linear models, etc. the sensitivity analysis system 100, in one or more examples, converts the visual information from the carpet plot 600 into a set of description, summarizing the sensitivities that are derived from the plot.

Figure 8:
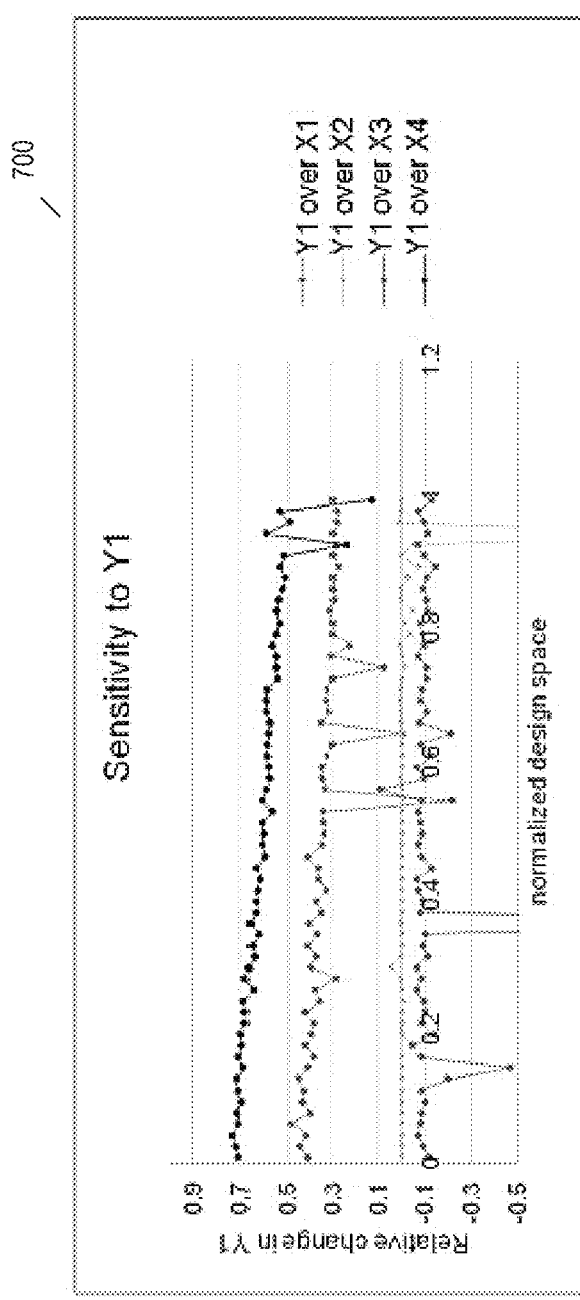
FIG. 8 depicts another visualization scheme for the global sensitivity analysis result according to one or more embodiments.

FIG. 8 depicts another visualization scheme for the global sensitivity analysis result according to one or more embodiments. Here, the sensitivity result data is shown in a line plot 700 in which the operator can see the relative sensitivity, i.e. the percent change of a particular output variable with respect to a change of an input variable in the normalized input space. In the example plot 700 of FIG. 8, the input variable X3 has a high positive impact on the output variable Y1, while the variable X4 has a smaller impact, the variable X1 has a negative impact, and the variable X2 seems to not have an impact on the output variable. Further, the variables X4 and X1 have a higher impact on the lower boundary of their design space than on their upper boundary. The sensitivity analysis system 100 accordingly provides a visualization for the effect of one or more process parameters from the problem definition on the engineering system 110 using the whole design space.

The technical solutions described herein accordingly facilitate an operator to accurately quantify the parameter sensitivity across the response design space of interest, both in global and local domain of interest. The operator can use the sensitivity results to focus on a particular region of the design space, while also using engineering judgment in to configure the engineering system. The technical solutions described herein also provide the operator the critical parameters that are to be tightly controlled from the perspective of manufacturing tolerances when configuring the engineering system. In one or more examples, the technical solutions described herein auto-generate one or more sensitivity charts and provide a summary of one or more observations from the charts using visual analytics for deriving sensitivity metrics from the charts.

The technical solutions described herein employ a global sampling scheme that ensures optimal distribution across the design space of interest that increases the efficiency in global exploration. Further, a perturbation schema is controlled by an algorithm that ensures that "unexplored" local regional sites are given due importance for parameter perturbation, thereby increasing the effectiveness of sensitivity evaluation. The global sensitivity is evaluated to capture both for main and interaction effects. Further, the technical solutions also perform a local search to focus on a particular region of interest and can iterate with the global search till convergence is reached.

As described herein, the technical solutions employ a probabilistic sampling scheme to enable exploring a non-uniform process parameter space. Further, a perturbation is used to "probabilistically" perturb random inputs variables to effect a change in responses. The change in responses is utilized to derive sensitivity information to quantify key variables that control tolerances of the engineering system.

The technical solutions described herein accordingly provide a reduction in engineering cycle time and accelerates faster deployment of products in the marketplace. The technical solutions thus provide an improvement to an engineering system and particularly to computing global sensitivities.

Further, the technical solutions described herein streamline root cause analysis by the application of global sensitivities, because operators are provided which parameters are causing some phenomenon to happen than others and possibly why. This can lead to a better understanding of component/product failures, thus leading to a reduction in service/overall effort. Parameters causing engineering deviations, such as manufacturing deviations, can be better understood through this approach and hence the engineering system can be configured to avoid the deviations proactively, thus leading to a reduction in rejected parts. The technical solutions described herein accordingly provide an improvement to manufacturing and other engineering systems.

Figure 9:
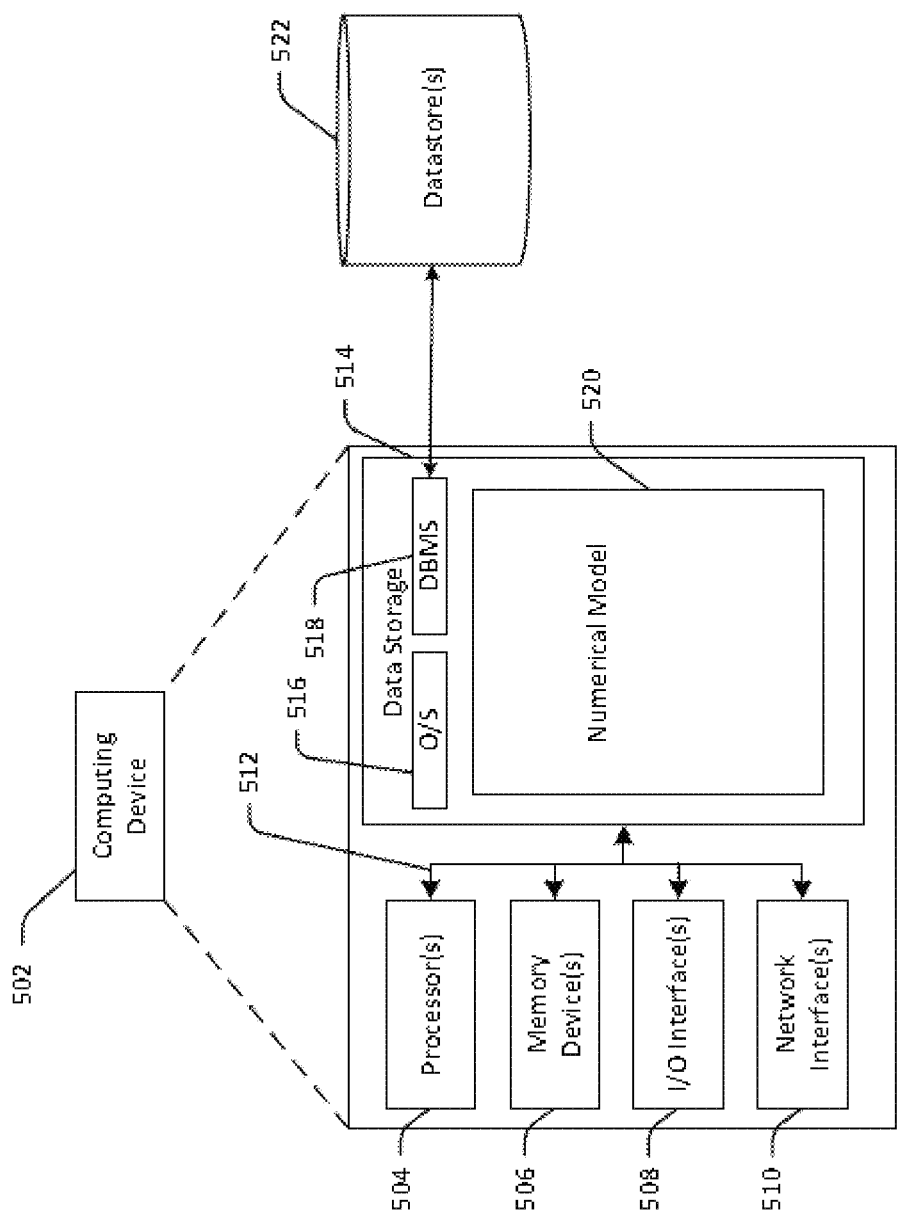
FIG. 9 is a schematic diagram of an illustrative computing device 502 configured to implement one or more example embodiments

FIG. 9 is a schematic diagram of an illustrative computing device 502 configured to implement one or more example embodiments. The computing device 502 may be any suitable device including, without limitation, a server, a personal computer (PC), a tablet, a smartphone, a wearable device, a voice-enabled device, or the like. While any particular component of the computing device 502 may be described herein in the singular, it should be appreciated that multiple instances of any such component may be provided, and functionality described in connection with a particular component may be distributed across multiple ones of such a component.

Although not depicted in FIG. 9, the computing device 502 may be configured to communicate with one or more other devices, systems, datastores, or the like via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 502 may include one or more processors (processor(s)) 504, one or more memory devices 506 (generically referred to herein as memory 506), one or more input/output ("I/O") interface(s) 508, one or more network interfaces 510, and data storage 514. The computing device 502 may further include one or more buses 512 that functionally couple various components of the computing device 502.

The bus(es) 512 may include at least one of a system bus, a memory bus, an address bus, or a message bus, and may permit the exchange of information (e.g., data (including computer-executable code), signaling, etc.) between various components of the computing device 502. The bus(es) 512 may include, without limitation, a memory bus or a memory controller, a peripheral bus, an accelerated graphics port, and so forth. The bus(es) 512 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 506 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 506 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 506 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 506 and the data storage 514, removable and/or non-removable, are examples of computer-readable storage media (CRSM) as that term is used herein.

The data storage 514 may store computer-executable code, instructions, or the like that may be loadable into the memory 506 and executable by the processor(s) 504 to cause the processor(s) 504 to perform or initiate various operations. The data storage 514 may additionally store data that may be copied to memory 506 for use by the processor(s) 504 during the execution of the computer-executable instructions. Moreover, output data generated as a result of execution of the computer-executable instructions by the processor(s) 504 may be stored initially in memory 506 and may ultimately be copied to data storage 514 for non-volatile storage.

More specifically, the data storage 514 may store one or more operating systems (O/S) 516; one or more database management systems (DBMS) 518 configured to access the memory 506 and/or one or more external datastores 428 (which may include the data repository 116); and one or more program modules, applications, engines, managers, computer-executable code, scripts, or the like such as, for example, a model 520 of the engineering system 110. Any of the components depicted as being stored in data storage 514 may include any combination of software, firmware, and/or hardware. The software and/or firmware may include computer-executable instructions (e.g., computer-executable program code) that may be loaded into the memory 506 for execution by one or more of the processor(s) 504 to perform any of the operations described earlier in connection with correspondingly named modules.

Although not depicted in FIG. 9, the data storage 514 may further store various types of data utilized by components of the computing device 502 (e.g., data stored in the datastore(s) 522). Any data stored in the data storage 514 may be loaded into the memory 506 for use by the processor(s) 504 in executing computer-executable instructions. In addition, any data stored in the data storage 514 may potentially be stored in the external datastore(s) 522 and may be accessed via the DBMS 518 and loaded in the memory 506 for use by the processor(s) 504 in executing computer-executable instructions.

The processor(s) 504 may be configured to access the memory 506 and execute computer-executable instructions loaded therein. For example, the processor(s) 504 may be configured to execute computer-executable instructions of the various program modules, applications, engines, managers, or the like of the computing device 502 to cause or facilitate various operations to be performed in accordance with one or more embodiments of the disclosure. The processor(s) 504 may include any suitable processing unit capable of accepting data as input, processing the input data in accordance with stored computer-executable instructions, and generating output data. The processor(s) 504 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 504 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 504 may be capable of supporting any of a variety of instruction sets.

Referring now to other illustrative components depicted as being stored in the data storage 514, the O/S 516 may be loaded from the data storage 514 into the memory 506 and may provide an interface between other application software executing on the computing device 502 and hardware resources of the computing device 502. More specifically, the O/S 516 may include a set of computer-executable instructions for managing hardware resources of the computing device 502 and for providing common services to other application programs. In certain example embodiments, the O/S 516 may include or otherwise control the execution of one or more of the program modules, engines, managers, or the like depicted as being stored in the data storage 514. The O/S 516 may include any operating system now known or which may be developed in the future including, but not limited to, any server operating system, any mainframe operating system, or any other proprietary or non-proprietary operating system.

The DBMS 518 may be loaded into the memory 506 and may support functionality for accessing, retrieving, storing, and/or manipulating data stored in the memory 506, data stored in the data storage 514, and/or data stored in external datastore(s) 522. The DBMS 518 may use any of a variety of database models (e.g., relational model, object model, etc.) and may support any of a variety of query languages. The DBMS 518 may access data represented in one or more data schemas and stored in any suitable data repository. Data stored in the datastore(s) 522 may include, for example, experimental surface temperature data, model parameter data, and so forth. External datastore(s) 522 that may be accessible by the computing device 502 via the DBMS 518 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 502, the input/output (I/O) interface(s) 508 may facilitate the receipt of input information by the computing device 502 from one or more I/O devices as well as the output of information from the computing device 502 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 502 or may be separate. The I/O devices may further include, for example, any number of peripheral devices such as data storage devices, printing devices, and so forth.

The I/O interface(s) 508 may also include an interface for an external peripheral device connection such as universal serial bus (USB), FireWire, Thunderbolt, Ethernet port or other connection protocol that may connect to one or more networks. The I/O interface(s) 508 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 502 may further include one or more network interfaces 510 via which the computing device 502 may communicate with any of a variety of other systems, platforms, networks, devices, and so forth. The network interface(s) 510 may enable communication, for example, with one or more other devices via one or more of the network(s).

It should be appreciated that the program modules/engines (e.g., the numerical model 520) depicted in FIG. 9 as being stored in the data storage 514 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 502 and/or other computing devices accessible via one or more networks, may be provided to support functionality provided by the modules depicted in FIG. 9 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 9 may be implemented, at least partially, in hardware and/or firmware across any number of devices.

It should further be appreciated that the computing device 502 may include alternate and/or additional hardware, software, or firmware components beyond those described or depicted without departing from the scope of the disclosure. More particularly, it should be appreciated that software, firmware, or hardware components depicted as forming part of the computing device 502 are merely illustrative and that some components may not be present or additional components may be provided in various embodiments. While various illustrative modules have been depicted and described as software modules stored in data storage 514, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the methods described herein may be performed by a computing device 502 having the illustrative configuration depicted in FIG. 9, or more specifically, by one or more program modules, engines, applications, or the like executable on such a device. It should be appreciated, however, that such operations may be implemented in connection with numerous other device configurations.

The operations described and depicted in the illustrative methods described herein may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted herein may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for performing a sensitivity analysis of an engineering system in spatial temporal domain, the method comprising:
receiving a set of process parameters, each process parameter being a configurable input of the engineering system;
retrieving a multidimensional dataset containing historical values of the process parameters and corresponding output values of the engineering system;
selecting a sampling algorithm to divide the multidimensional dataset into multiple subspaces;
selecting a plurality of samples ($x_i$) from the multidimensional dataset, the plurality of samples comprises one sample from each of the multiple subspaces;
perturbing the plurality of samples;
computing a first effect ($EE_i$) of perturbing a sample ($x_i$) on an output value (y) of the engineering system;
computing a second effect ($SEE_{ij}$) of perturbing a pair of samples ($x_i$ and $x_j$) on the output value (y) of the engineering system;
computing a sensitivity coefficient of the process parameters on the output of the engineering system using the second effect for the samples $x_i$ and $x_j$, the first effect for the sample $x_i$, and the first effect for the sample $x_j$;
based on the sensitivity coefficient, configuring the engineering system so as to change one or more of the output values of the engineering system; and
generating a visualization of the perturbed samples and the corresponding output values, the visualization defining a carpet plot having multiple cells, each cell of the multiple cells corresponding to a different pair that includes at least one respective output value or at least one respective perturbed sample,
wherein perturbing the plurality of samples comprises changing a first sample of the plurality of samples from a first cell to a second sample from a second cell adjacent to the first cell.

2. The method of claim 1, wherein perturbing the plurality of samples further comprises changing the first sample by a percentage of a value of the first sample.

3. The method of claim 1, wherein the engineering system is a first engineering system, and the multidimensional dataset comprises values of the process parameters from a second engineering system.

4. The method of claim 1, wherein the set of process parameters is provided by an operator.

5. The method of claim 1, wherein the first effect is computed as:

$$EE_i(x) = \frac{[y(x + e_i\Delta) - y(x)]}{y(x)},$$

where $e_i\Delta$ is a perturbation value, x is a sample value, and y is an output value.

6. The method of claim 1, further comprising automatically identifying one or more critical process parameters and one or more critical responses that affect the engineering system using dynamic estimation of weights.

7. A sensitivity analysis system, comprising:
a memory device; and
a processor coupled with the memory device, the processor configured to perform a sensitivity analysis of an engineering system comprising:
receiving a set of process parameters, each process parameter being a configurable input of the engineering system;
retrieving a multidimensional dataset containing historical values of the process parameters and corresponding output values of the engineering system;
selecting a sampling algorithm to divide the multidimensional dataset into multiple subspaces;
selecting a plurality of samples ($x_i$) from the multidimensional dataset, the plurality of samples comprises one sample from each of the multiple subspaces;
perturbing the plurality of samples;
computing a first effect ($EE_i$) of perturbing a sample ($x_i$) on an output value (y) of the engineering system;
computing a second effect ($SEE_{ij}$) of perturbing a pair of samples ($x_i$ and $x_j$) on the output value (y) of the engineering system;
computing a sensitivity coefficient of the process parameters on the output of the engineering system using the second effect for the samples $x_i$ and $x_j$, the first effect for the sample $x_i$, and the first effect for the sample $x_j$;

based on the sensitivity coefficient, configuring the engineering system so as to change one or more of the output values of the engineering system; and generating a visualization of the perturbed samples and the corresponding output values, the visualization defining a carpet plot having multiple cells, each cell of the multiple cells corresponding to a different pair that includes at least one respective output value or at least one respective perturbed sample, wherein perturbing the plurality of samples comprises changing a first sample of the plurality of samples from a first cell to a second sample from a second cell adjacent to the first cell.

8. The system of claim 7, wherein perturbing the plurality of samples further comprises changing the first sample by a percentage of a value of the first sample.

9. The system of claim 7, wherein the engineering system is a first engineering system, and the multidimensional dataset comprises values of the process parameters from a second engineering system.

10. The system of claim 7, wherein the set of process parameters is provided by an operator.

11. The system of claim 7, wherein the first effect is computed as:

$$EE_i(x) = \frac{[y(x + e_i\Delta) - y(x)]}{y(x)},$$

where $e_i\Delta$ is a perturbation value, x is a sample value, and y is an output value.

12. A computer program product comprising a storage medium readable by a processing circuit, the storage medium storing instructions executable by the processing circuit to cause a method to be performed, the method comprising:

receiving a set of process parameters, each process parameter being a configurable input of an engineering system;

retrieving a multidimensional dataset containing historical values of the process parameters and corresponding output values of the engineering system;

selecting a sampling algorithm to divide the multidimensional dataset into multiple subspaces;

selecting a plurality of samples ($x_i$) from the multidimensional dataset, the plurality of samples comprises one sample from each of the multiple subspaces;

perturbing the plurality of samples;

computing a first effect ($EE_i$) of perturbing a sample ($x_i$) on an output value (y) of the engineering system;

computing a second effect ($SEE_{ij}$) of perturbing a pair of samples ($x_i$ and $x_j$) on the output value (y) of the engineering system;

computing a sensitivity coefficient of the process parameters on the output of the engineering system using the second effect for the samples $x_i$ and $x_j$, the first effect for the sample $x_i$, and the first effect for the sample $x_j$; and based on the sensitivity coefficient, configuring the engineering system so as to change one or more of the output values of the engineering system; and generating a visualization of the perturbed samples and the corresponding output values, the visualization defining a carpet plot having multiple cells, each cell of the multiple cells corresponding to a different pair that includes at least one respective output value or at least one respective perturbed sample, wherein perturbing the plurality of samples comprises changing a first sample of the plurality of samples from a first cell to a second sample from a second cell adjacent to the first cell.

13. The computer program product of claim 12, wherein perturbing the plurality of samples further comprises changing the first sample by a percentage of a value of the first sample.

14. The computer program product of claim 12, wherein the engineering system is a first engineering system, and the multidimensional dataset comprises values of the process parameters from a second engineering system.

15. The computer program product of claim 12, wherein the set of process parameters is provided by an operator.

16. The computer program product of claim 12, wherein the first effect is computed as $$EE_i(x) = \frac{[y(x + e_i\Delta) - y(x)]}{y(x)},$$

where $e_i\Delta$ is a perturbation value, x is a sample value, and y is an output value.

* * * * *